US012663878B2

(12) United States Patent
Van Ruymbeke et al.

(10) Patent No.: US 12,663,878 B2
(45) Date of Patent: Jun. 23, 2026

(54) APPARATUS FOR ENABLING A SMARTPHONE INTO A REMOTE CONTROLLER FOR A RADIO-CONTROLLED INSTRUMENT

(71) Applicants: Edwin Van Ruymbeke, Marseilles (FR); Romain Miot, Marseilles (FR)

(72) Inventors: Edwin Van Ruymbeke, Marseilles (FR); Romain Miot, Marseilles (FR)

( * ) Notice: Subject to any disclaimer, the term of this patent is extended or adjusted under 35 U.S.C. 154(b) by 133 days.

(21) Appl. No.: 18/517,383

(22) Filed: Nov. 22, 2023

(65) Prior Publication Data

US 2025/0165083 A1     May 22, 2025

(51) Int. Cl.
| | |
|---|---|
| *G06F 3/0338* | (2013.01) |
| *G05G 5/05* | (2006.01) |
| *G05G 9/047* | (2006.01) |
| *G05G 13/00* | (2006.01) |
| *G06F 3/01* | (2006.01) |
| *H04M 1/04* | (2006.01) |

(52) U.S. Cl.
CPC ............. *G06F 3/0338* (2013.01); *G05G 5/05* (2013.01); *G05G 9/047* (2013.01); *G05G 13/00* (2013.01); *G06F 3/016* (2013.01); *G05G 2009/04766* (2013.01); *G05G 2505/00* (2013.01); *H04M 1/04* (2013.01)

(58) Field of Classification Search
CPC ......... G06F 3/0338; G06F 3/016; G05G 5/05; G05G 9/047; G05G 13/00; G05G 2009/04766; G05G 2505/00; H04M 1/04
See application file for complete search history.

(56) References Cited

U.S. PATENT DOCUMENTS 9,170,658 B2 * 10/2015 Quek .................... G06F 3/0338
10,437,411 B2 * 10/2019 Helmes ................... A63F 13/23
(Continued)

FOREIGN PATENT DOCUMENTS

JP      2014003395 A  *  1/2014  ............... H04Q 9/00
KR    20150117552 A  * 10/2015  ............. G06F 3/044

OTHER PUBLICATIONS

JP2014003395A—English Translation of the Description (Year: 2014).*
(Continued)

*Primary Examiner* — Kito R Robinson
*Assistant Examiner* — Alexander V Gentile

(57) ABSTRACT

The present disclosure relates to an apparatus for enabling a smartphone into a remote controller for a radio-controlled instrument. The apparatus comprises a fixing support assembly, a steering assembly, and a throttle assembly. The fixing support assembly is configured for rigidly clamping a smartphone. The steering assembly is set over the fixing support assembly and configured for maneuvering a first capacitive tip over screen surface of the smartphone for providing steering control over the radio-controlled instrument. The throttle assembly is set over the fixing support assembly and configured for maneuvering a second capacitive tip over the screen surface for providing throttle control over the instrument. The steering assembly and the throttle assembly are configured to transmit capacitive effect of fingers of the user to the screen of the smartphone in order to remotely control the radio-controller instrument.

7 Claims, 5 Drawing Sheets

(56)                    References Cited

U.S. PATENT DOCUMENTS

| | | | |
|---|---|---|---|
| 11,853,492 B2 * | 12/2023 | Eberwein ................ | G06F 3/044 |
| 2008/0238879 A1 * | 10/2008 | Jaeger ................... | G06F 3/0338 |
| | | | 345/173 |
| 2014/0247246 A1 * | 9/2014 | Maus .................... | G06F 3/0393 |
| | | | 345/174 |
| 2025/0025772 A1 * | 1/2025 | Kong ................... | A63F 13/218 |

OTHER PUBLICATIONS

KR 20150117552 A English Translation (Year: 2015).*
JP 2014003395 A English Translation (Year: 2014).*

* cited by examiner

APPARATUS FOR ENABLING A SMARTPHONE INTO A REMOTE CONTROLLER FOR A RADIO-CONTROLLED INSTRUMENT

TECHNICAL FIELD

The present disclosure relates to an apparatus for enabling a smartphone into a remote controller for a radio-controlled instrument. Particularly, but not exclusively, the present disclosure is directed towards a mechanical apparatus, to be used with a smartphone, for enabling the smartphone into a remote controller for a radio-controlled instrument.

BACKGROUND

A conventional remote controller for radio-controlled instruments, such as remote-controlled cars, drones, or other devices, typically consists of several key components and functions. These controllers are often referred to as radio transmitters or radio transceivers, and they enable users to remotely control the movements and actions of their radio-controlled instruments. Conventional remote controllers for radio-controlled instruments have been widely used for many years, and while they are effective for their intended purposes, they do have some inherent limitations and problems. Remote controllers typically have a limited control range, which can restrict the operational area of the radio-controlled instrument. Interference and signal loss may occur if the device goes beyond this range. Traditional remote controllers have a finite number of channels and controls, limiting the complexity of actions that can be performed. Complex maneuvers or additional features may require more advanced controllers. Further, the battery life of remote controllers can be limited, and users may need to carry spare batteries or recharge them frequently, which can interrupt play or operation. Some remote controllers can be bulky and not very portable, making them less convenient for on-the-go usage.

Further, replacing physical remote controllers with smartphone apps has become increasingly common in various applications, including the control of radio-controlled instruments like drones, RC cars, and more. Users typically carry their smartphones with them, making it easy to control their radio-controlled instruments without the need for an additional physical remote. This convenience can lead to more frequent and spontaneous use. Smartphones are versatile and multifunctional devices. They can serve not only as a remote controller but also as a data display, telemetry device, and even a video monitor. This versatility enhances the user experience. Smartphone apps can be easily updated to provide new features, improve performance, and fix bugs. Users can also customize their control interfaces to suit their preferences.

However, the smartphone apps lack physical controls and tactile feedback, which can make precise and responsive control more challenging, especially for applications like drone flying where fine adjustments are crucial. Further, the smartphone apps are devoid of providing similar haptic return and precision like the conventional remote controller. Furthermore, the existing physical remote controllers are all electronic devices that communicate with the smartphone through radio link such as Bluetooth which requires electric energy for being operational, wherein such radio link often makes the control interrupted. In order to avoid such problems, there is a need for an improved apparatus that can be easily compatible with any kind of smartphones and can provide similar haptic return and precision like the physical remote controller without using any kind of radio link and electric energy.

The present disclosure is directed to overcome one or more limitations stated above, and any other limitation associated with the prior arts.

SUMMARY

One or more shortcomings of the prior art are overcome, and additional advantages are provided through the present disclosure. Additional features and advantages are realized through the techniques of the present disclosure. Other embodiments and aspects of the disclosure are described in detail herein and are considered a part of the claimed disclosure.

The present invention is directed to an apparatus for enabling a smartphone into a remote controller for a radio-controlled instrument. The apparatus comprises a fixing support assembly, a steering assembly, and a throttle assembly. The fixing support assembly is configured for rigidly clamping a smartphone. The steering assembly is set over the fixing support assembly and configured for maneuvering a first capacitive tip over screen surface of the smartphone for providing steering control over the radio-controlled instrument. The throttle assembly is set over the fixing support assembly and configured for maneuvering a second capacitive tip over screen surface of the smartphone for providing throttle control over the radio-controlled instrument. The steering assembly and the throttle assembly are configured to transmit capacitive effect of fingers of the user to the screen of the smartphone in order to remotely control the radio-controller instrument and aids in receiving haptic return and precision in desired controls over the radio-controller instrument.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 7:
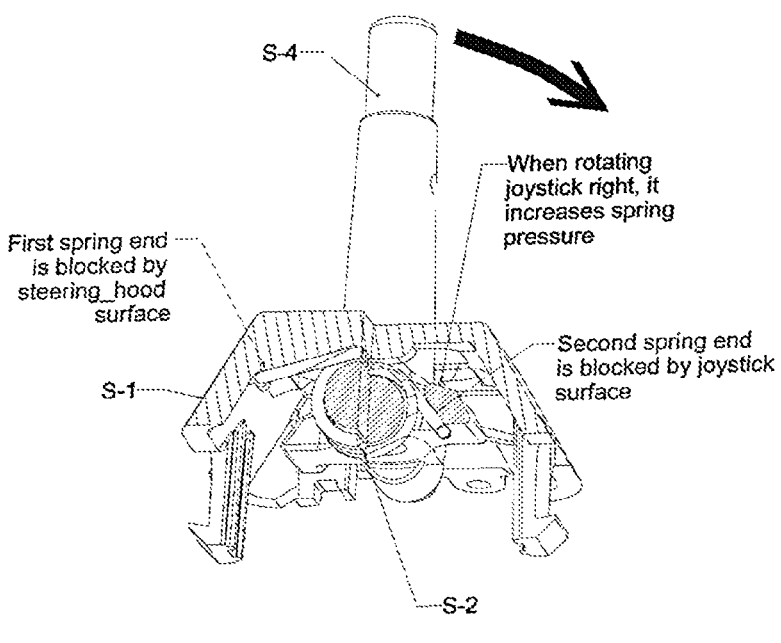
Figure 8:
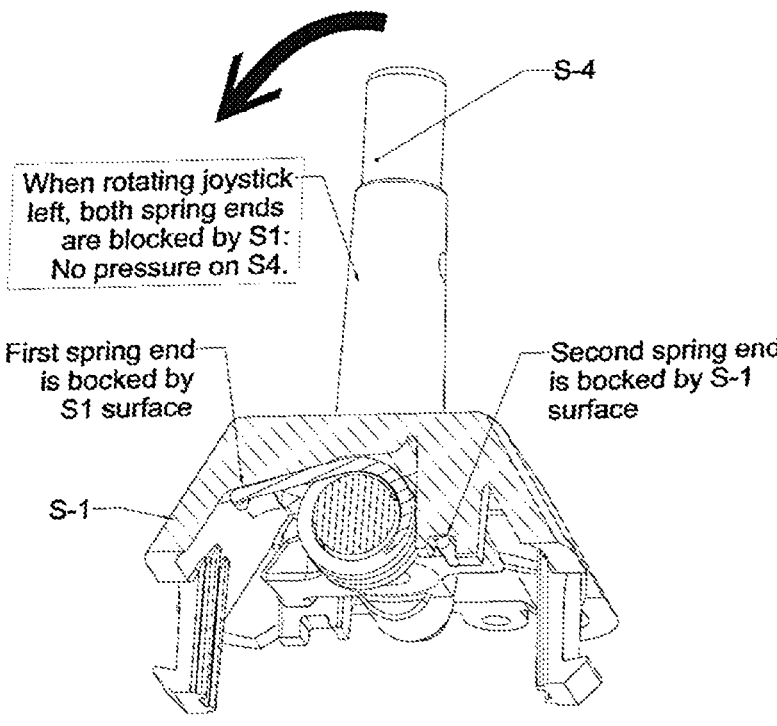

FIG. 7 illustrate a cross-sectional view of the steering assembly showing spring position while moving the steering assembly in extreme right position, in accordance with an embodiment of the present disclosure; and FIG. 8 illustrate a cross-sectional view of the steering assembly showing spring position while moving the steering assembly in extreme left position, in accordance with an embodiment of the present disclosure.

The figure depicts embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or process that comprises a list of components or steps does not include only those components or steps but may include other components or steps not expressly listed or inherent to such setup or device or process. In other words, one or more elements in a system or apparatus proceeded by "comprises . . . a" does not, without more constraints, preclude the existence of other elements or additional elements in the system or apparatus.

Embodiments of the present disclosure provide an apparatus for enabling a smartphone into a remote controller for a radio-controlled instrument. The apparatus comprises a fixing support assembly, a steering assembly, and a throttle assembly. The fixing support assembly is configured for rigidly clamping a smartphone. The steering assembly is set over the fixing support assembly and configured for maneuvering a first capacitive tip over screen surface of the smartphone for providing steering control over the radio-controlled instrument. The throttle assembly is set over the fixing support assembly and configured for maneuvering a second capacitive tip over screen surface of the smartphone for providing throttle control over the radio-controlled instrument. The steering assembly comprises a steering joystick, a pair of steering torsion springs, a first joystick spring, a steering hood, a first conductive pin, a first joystick piston, and a first holding ring. The throttle assembly comprises a throttle joystick, a throttle torsion spring, a second joystick spring, a throttle hood, a second conductive pin, a second joystick piston, and a second holding ring. The steering assembly and the throttle assembly are configured in a manner so as to transmit capacitive effect of fingers of the user to the screen of the smartphone in order to remotely control the radio-controller instrument and aids in receiving haptic return and precision in desired controls over the radio-controller instrument.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
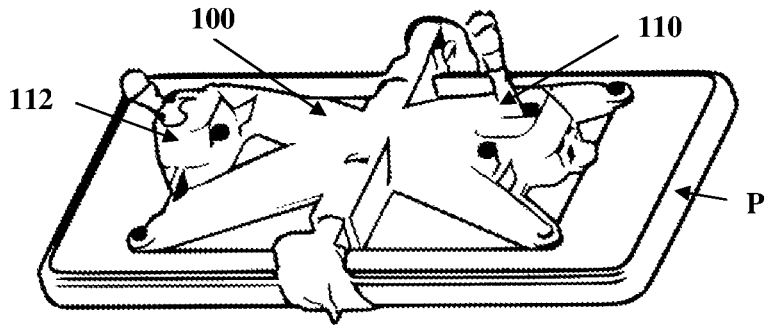
FIG. 1 illustrates a diagram representing an apparatus coupled with a smartphone for enabling the smartphone into a remote controller for a radio-controlled instrument, in accordance with an embodiment of the present disclosure.

The following paragraphs describe the present disclosure with reference to FIGS. 1-FIG. 8. In the figures, FIG. 1 is an exemplary embodiment of the present disclosure and illustrates an apparatus coupled with a smartphone for enabling the smartphone into a remote controller for a radio-controlled instrument. The apparatus (100) is securely attached to a smartphone (P). The apparatus comprises a fixing support assembly, a steering assembly (110), and a throttle assembly (112). The steering assembly (110) and the throttle assembly (112) are both in respective resting positions. The apparatus (100) is also effectively adaptable to various smartphone sizes, wherein the apparatus rigidly clamps a smartphone (P) so as to restrict any movement for providing maximum accurate precision in controlling the radio-controlled instruments. The apparatus (100) can further enable transmission of electric capacity of human finger to a screen surface of the smartphone (P).

The smartphone is a handheld electronic device that combines the functions of a mobile phone with various other features and capabilities. These devices have become ubiquitous in modern society, providing a wide range of functions beyond voice calls and text messaging. The key features and functions of the smartphone are communication, Internet connectivity, multimedia, mobile applications, navigation etc.

However, it is understood by a person skilled in the art that the size and configuration of the apparatus (100) may be variable in accordance with the requirement of the different types of installation environment. Any such variation/modification shall be construed to be within the scope of the present disclosure.

Figure 2:
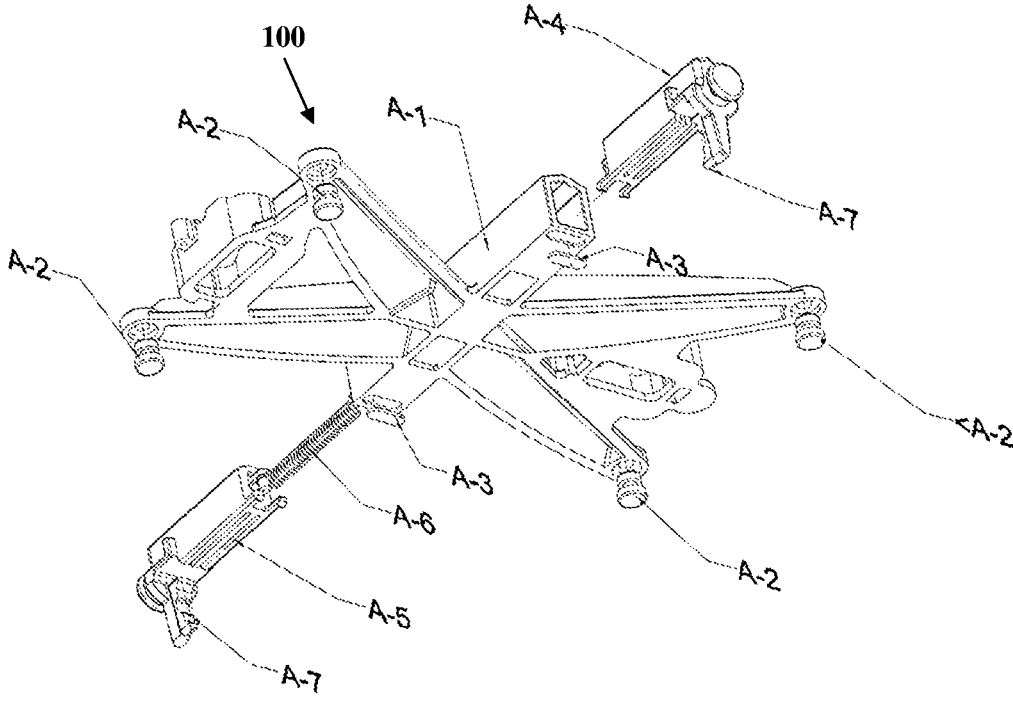
FIG. 2 illustrates structural components of the apparatus, in accordance with an embodiment of the present disclosure.

As illustrated in FIG. 2, the fixing support assembly comprises an assembly base structure (A-1), a set of rubber tips (A-2, A-3), a pair of hooks (A-4, A-5), a pair of hook tips (A-7), and a rubber band (A-8). The assembly base structure (A-1) is made of molded non-conductive plastic. Molded non-conductive plastic refers to plastic materials that are specially designed to be non-conductive of electricity or heat. This type of plastic is often used in applications where electrical insulation or the prevention of heat transfer is essential.

The set of rubber tips (A-2, A-3) protect contacts of the assembly base structure (A-1) with the screen surface of the smartphone by increased adherence. Usually, if external contact occurred while pasting or attaching something to a smartphone screen, it could potentially result in various types of damage. The extent and type of damage can vary depending on the force, material, and method of contact. The rubber tips (A-2, A-3) are used to avoid such damage on the screen surface of the smartphone.

The pair of hooks (A-4, A-5) are extensively slidable in opposite direction over the assembly base structure (A-1). The hooks can slide by means of slider tension springs (A-6). A slider tension spring is a type of mechanical spring that is commonly used in various applications where tension or extension forces are required. The pair of hooks (A-4, A-5) can glide in the central tube of the assembly base structure (A-1) rather than being fixedly attached. In addition to being able to adjust to different phone widths, these hooks can also apply pressure to the side of a smartphone to clamp the device in place.

Figure 3:
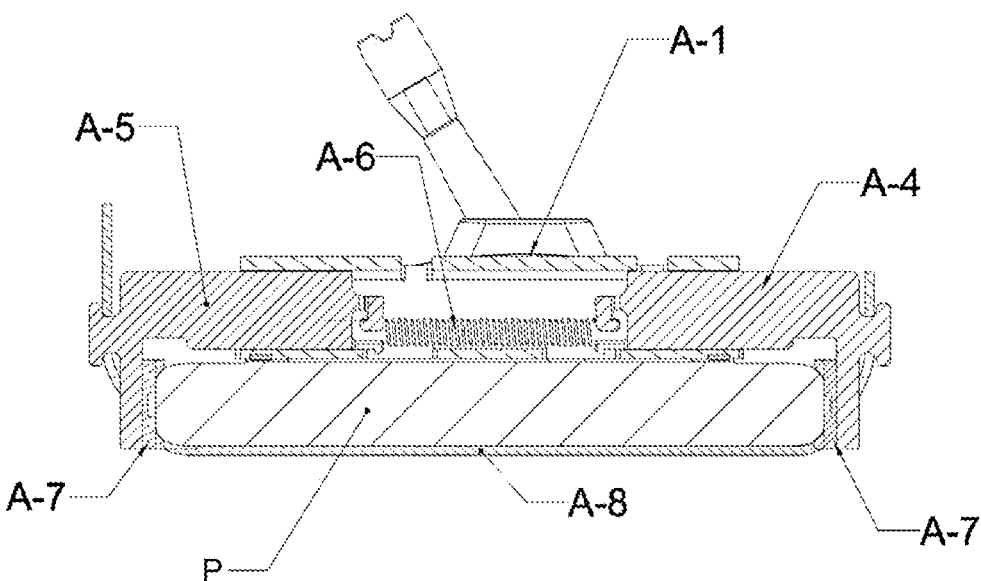
FIG. 3 illustrates a cross-sectional view of the apparatus coupled with the smartphone, in accordance with an embodiment of the present disclosure.

These springs are designed to provide resistance when they are pulled or extended and then return to their original length when the force is released. Such spring-based tension aids in rigidly clamping the smartphone (P) on two different sides of either horizontal sides or vertical sides of the smartphone. The pair of hooks are made of molded non-conductive plastic. Further, the pair of hook tips (A-7) are secured on the pair of hooks for protecting contact with the smartphone and avoid pressing on buttons of the smartphone. The rubber band (A-8) is arranged for strapping the smartphone over surface opposite to the screen of the smartphone (P) as illustrated in FIG. 3. The rubber band is also designed with shaped holes to prevent interference with the hooks. Therefore, the rubber band in combination with the pair of hooks coupled over the slider tension springs provide a efficient operational arrangement over the smartphone (P) by rigidly clamping the smartphone leaving minimal scope of displacement in any direction.

Figure 4A:
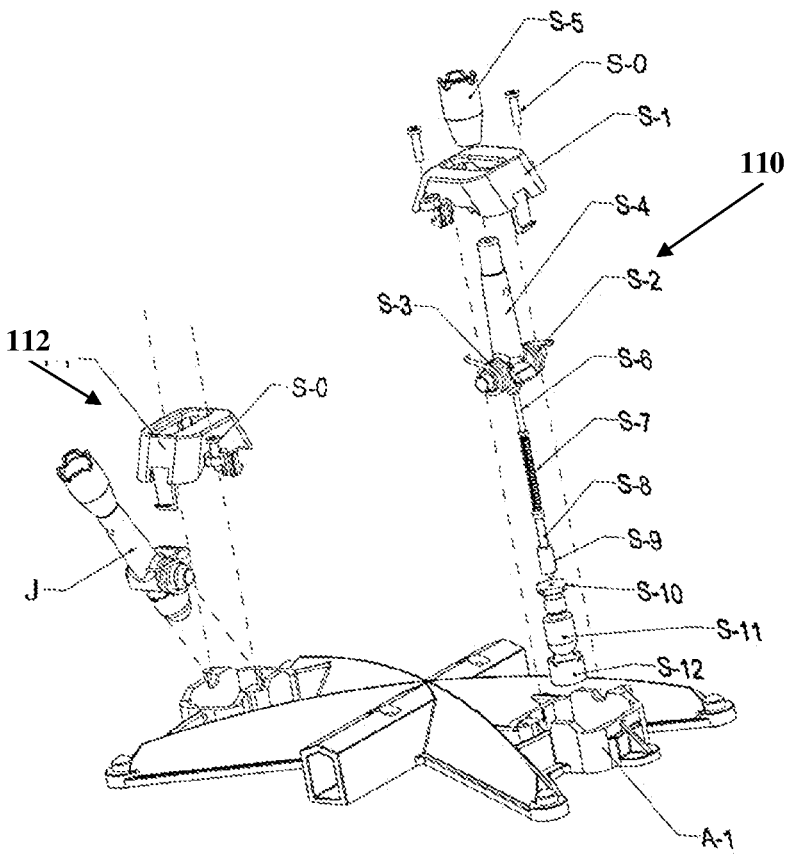
FIG. 4A-4B illustrate structural components of a steering assembly and a throttle assembly of the apparatus as illustrated in FIG. 1, in accordance with an embodiment of the present disclosure.

As illustrated in FIG. 4A, the steering assembly comprises a steering joystick (S-4), a pair of steering torsion springs (S-2, S-3), a first joystick spring (S-7), a steering hood (S-1), a first conductive pin (S-6), a first joystick piston (S-10), and a first holding ring (S-12). The steering joystick (S-4) is having a first joystick tip (S-5) on top of the steering joystick. The steering joystick (S-4) is made of conductive plastic and can be rotated in left or right directions as per control of a user. The steering joystick (S-4) is automatically retracted to rest position upon released by the user. The first joystick tip (S-5) is made of aluminium and having a shape to adapt to a finger of the user. Further, the pair of steering torsion springs (S-2, S-3) are configured to have increased pressure on one of the pair of steering torsion springs (S-2, S-3) when the steering joystick (S-4) is rotated in either of the left or right by the user, and to retract to the rest position instantaneously when released by the user. In an example, as illustrated in FIG. 7, the cross-sectional view of the steering assembly shows that two ends of a spring (S-2) are blocked while rotating the steering joystick (S-4) towards right from rest position i.e. middle position. One end is pressed on an inner surface of the steering hood (S-1), the other end by an inner surface of the steering joystick (S-4).

In another example, ad illustrated in FIG. 8, when the steering joystick is rotated to left, there is another surface on the steering hood (S-1) shown in this particular cross-section that will hold the second end of the torsion spring (instead of the joystick surface). The result is there is no action at all of the $1^{st}$ spring on the steering joystick as soon as it moves leftward, not even 1° angle. Such position allows the spring to be designed with some 'pre-tension' even at vertical position, which will not tend to move the steering joystick on the left, but still require some force to move it to the right even a small angle. Further, the second spring (S-3) acts symmetrically in the other direction, bring back to vertical when turning left, does nothing when turning right. Finally, the steering joystick possess a firm middle position (vertical), requiring force to move left or right even a bit, and will be brought back in the vertical position instantly when released.

The first joystick spring (S-7) is made of spring steel and is configured to push a first sliding pin (S-8) down and make the first capacitive tip (S-11) to stay stuck on the screen surface. The first sliding pin (S-8) is made of metal and is configured to move freely vertically by means of a first joystick sleeve (S-9) that is made of conductive plastic. The first joystick sleeve (S-9) allows the capacitive tip (S-11) to follow the screen surface when the steering joystick (S-4) is rotating.

The steering hood (S-1) is made of molded non-conductive plastic and forms a housing for the pair of steering torsion springs, rotation axis of the steering joystick (S-4). The first conductive pin (S-6) is made of metal and is configured to conduct capacity from the first joystick tip (S-5) to the first joystick spring (S-7). The first joystick piston (S-10) is made of metal and is configured to hold the first capacitive tip (S-11) and link the first capacitive tip (S-11) to the first sliding pin (S-8). The first holding ring (S-12) is configured to press the first capacitive tip (S-11) on the first joystick piston (S-10) and firmly hold the first capacitive tip (S-11).

In one embodiment, the steering joystick (S-4), the first joystick tip (S-5), the pair of steering torsion springs (S-2, S-3), the first joystick spring (S-7), the first sliding pin (S-8), the first joystick sleeve (S-9), the first conductive pin (S-6), and the first joystick piston (S-10) are made of conductive materials so as to allow transmission of capacitive effect of fingers of the user to the screen of the smartphone. Further, a special conductive plastic is used for the steering joystick so as to make the steering joystick easily molded in spite of complex shape of the steering joystick, wherein the plastic is filled with specific percentage of carbon powder in order to make the plastic conductive.

Further, upon having the steering joystick (S-4), moving in left or right direction by the user for achieving desired movement in the radio-controlled instrument, a detected contact on the screen surface of the smartphone slides right or left. Such movements are calibrated in an application of the smartphone so as to enable the smartphone application to identify the desired action of the user in real time and operate the radio-controlled instrument accordingly. Calibrating a smartphone based on the movement of a joystick from a mechanical remote controller typically involves configuring the smartphone to interpret the joystick's movements accurately. Such process ensures that the joystick input corresponds correctly with the desired on-screen actions. The calibration process often involves following on-screen instructions such as move the joystick in various directions (up, down, left, right) to establish the neutral position, move the joystick to the extreme positions to set the joystick's range, and confirm or save the calibration settings once they are configured. Upon completion of the initial calibration, testing of the steering joystick (S-4) ensures that the smartphone interprets the input correctly. In the test procedure, it is required to check whether the movements of the steering joystick correspond accurately with the on-screen actions in the user's intended applications.

Figure 4B:
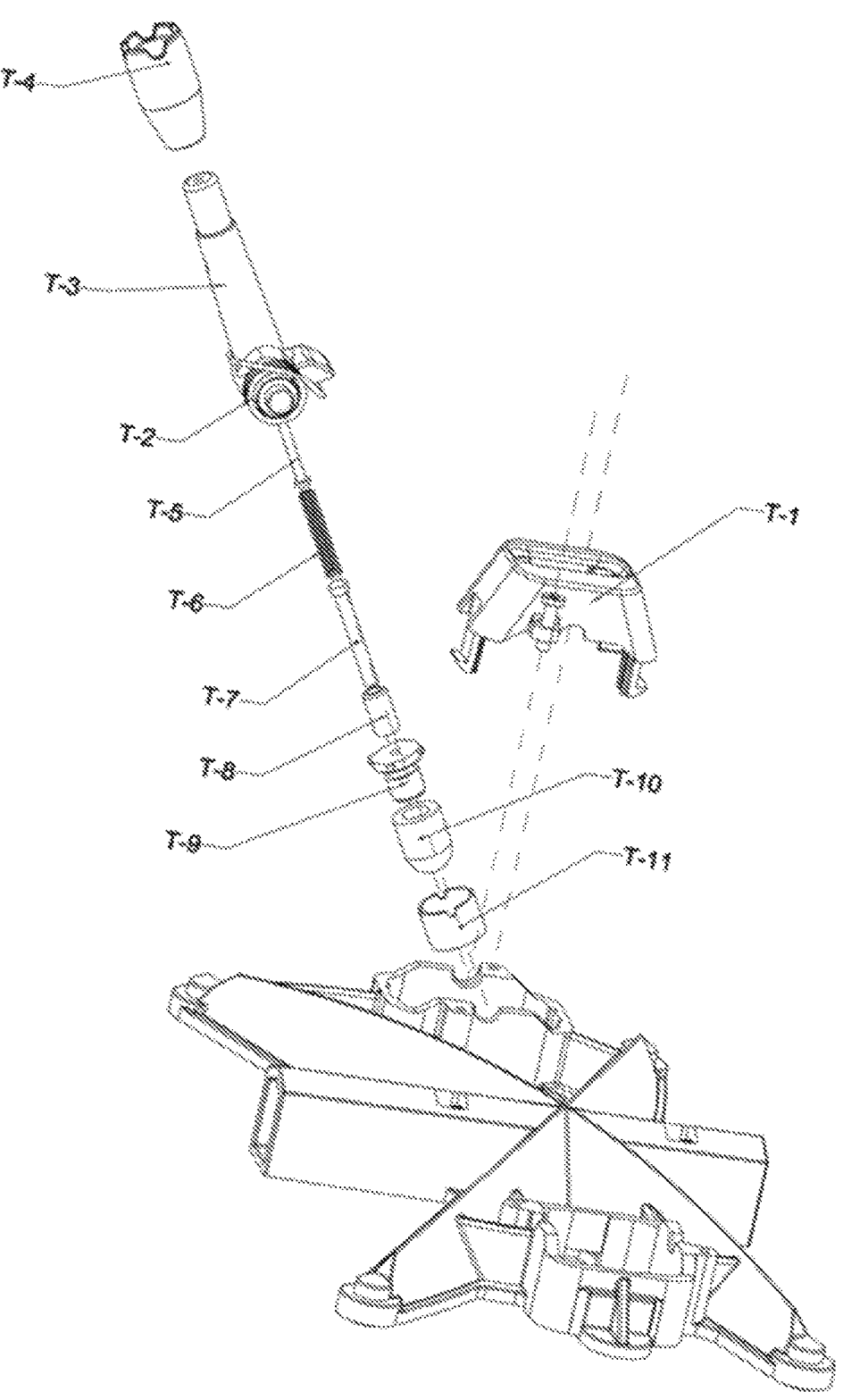

As illustrated in FIG. 4B, the throttle assembly comprises a throttle joystick (T-3), a throttle torsion spring (T-2), a second joystick spring (T-6), a throttle hood (T-1), a second conductive pin (T-5), a second joystick piston (T-9), and a second holding ring (T-11). The throttle joystick (T-3) is having a second joystick tip (T-4) on top of the throttle joystick (T-3). The throttle joystick (T-3) is made of conductive plastic and can be rotated up and down as per control of the user and automatically retracted to rest position upon released by the user. The second joystick tip (T-4) is made of aluminium and is having a shape to adapt to a finger of the user. The throttle torsion spring (T-2) is configured to receive increased pressure when the throttle joystick (T-3) is rotated in either of the up or down direction by the user, and to retract to the rest position instantaneously when released by the user.

The second joystick spring (T-6) is made of spring steel and is configured to push a second sliding pin (T-7) down and make the second capacitive tip (T-10) to stay stuck on the screen surface. The second sliding pin (T-7) is made of metal and is configured to move freely vertically by means of a second joystick sleeve (T-8) that is made of conductive plastic. The second joystick sleeve (T-8) allows the capacitive tip (T-10) to follow the screen surface when the throttle joystick (T-3) rotates.

The throttle hood (T-1) is made of molded non-conductive plastic and is a housing for the throttle torsion spring, rotation axis of the throttle joystick (T-3). The second conductive pin (T-5) is made of metal and is configured to conduct capacity from the second joystick tip (T-4) to the second joystick spring (T-6). The second joystick piston (T-9) is made of metal and is configured to hold the second capacitive tip (T-10) and link the second capacitive tip (T-10) to the second sliding pin (T-7). The second holding ring (T-11) is configured to press the second capacitive tip (T-10) on the second joystick piston (T-9) and firmly hold the second capacitive tip (T-10).

In one embodiment, the throttle joystick (T-3), the second joystick tip (T-4), the throttle torsion spring (T-2), the second joystick spring (T-6), the second sliding pin (T-7), the second joystick sleeve (T-8), the second conductive pin (T-5), and the second joystick piston (T-9) are made of conductive materials so as to allow transmission of capacitive effect of fingers of the user to the screen of the smartphone.

Further, upon having the throttle joystick (T-3) moving in upward direction by the user for achieving increased throttle in the radio-controlled instrument, a detected contact on the screen surface of the smartphone slides down. Such movements are calibrated in an application of the smartphone so as to enable the smartphone application to easily identify the desired action of the user and operate the radio-controlled instrument accordingly.

Thus, a unique mode for using the apparatus detailed here must be included in the application that governs the radio-controlled instrument. The sole purpose of the present invention is to provide a mechanical system that permits steering and throttle control by causing a movement to the left or right or up and down of a contact part (i.e. capacitive pen tip), which can be detected by any "touch" screen smartphone.

As the steering joystick (S-4) and the throttle joystick (T-3) rotate, the contact parts (S-11 and T-10) would also rotate in a rigid link with the respective joystick. The contact point on the screen would move on an arc of circle. To avoid this and allow the contact point to move on a plane surface (the screen), the joystick springs (S-7 and T-6) in the chain of aligned components linking S-4 to S-11 and T-3 to T-10. Such springs are chosen to constantly press the first capacitive tip (S-11) through S-8 and S-10 on the screen surface irrespective of the joystick angle, and to keep good capacitive contact, at same time as allowing the necessary stroke for the first sliding pin (S-8) to change a rotational movement into a horizontal one. The throttle assembly also works in the analogous approach.

Figure 5:
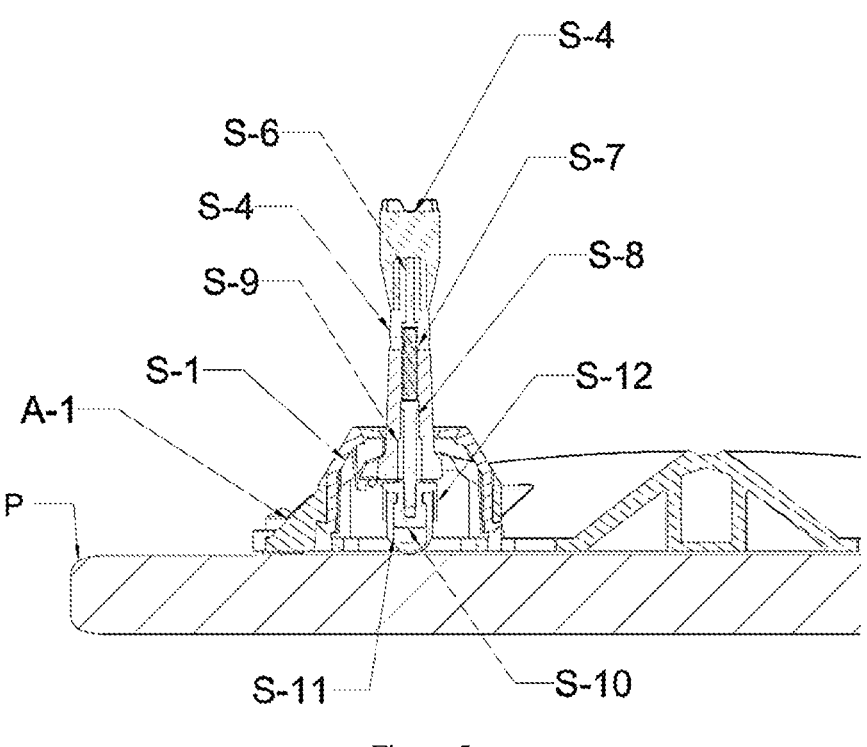
FIG. 5 illustrate a cross-sectional view of the steering assembly in rest position, in accordance with an embodiment of the present disclosure.

In an example, as illustrated in FIG. 5, the first joystick spring (S-7) is pressed at maximum. All the component of S-4, S-6, S-7, S-8, S-9, and S-12 are conductive, that aids in transmission of the conduction from the finger of the user to the screen of the smartphone (P). In this position of lever, the contact point with the screen is in the centre that indicates no action on steering.

Figure 6:
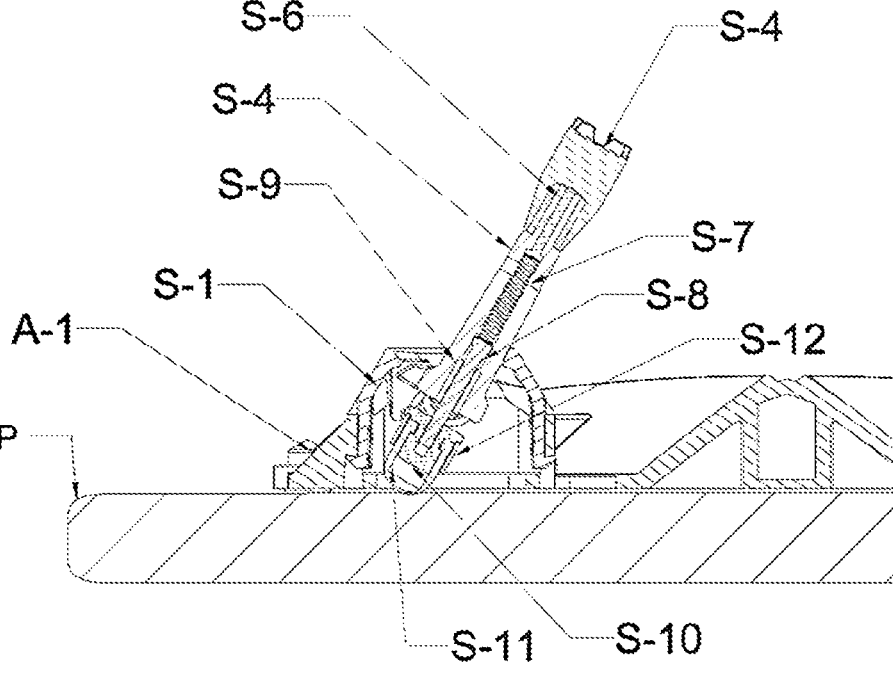
FIG. 6 illustrate a cross-sectional view of the steering assembly in extreme right position, in accordance with an embodiment of the present disclosure.

As illustrated in FIG. 6, the first joystick spring (S-7) has enough pressure to keep good contact, although in its maximum length. All the component of S-4, S-6, S-7, S-8, S-9, and S-12 are conductive, that aids in transmission of the conduction from the finger of the user to the screen of the smartphone (P). In this position of lever, the contact point with the screen is in the extreme left that would be interpreted by the application as turn right at maximum.

Advantages of the Present Disclosure

The present disclosure provides an apparatus (100) which can be accommodated with any smartphone with any size, calibrated accordingly, in order to remotely control the radio-controlled instrument while having haptic return and accurate precision in control. Also, the apparatus (100) is a mechanical system that does not require any power to operate on, the device simply acts as a control enabler for a smartphone configured to communicate to the radio-controlled instrument remotely.

The apparatus (100) can be manufactured at very less cost when compared to other remote controller commonly available in market till date and thus yield better cost per quality to customer.

In the detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The description is, therefore, not to be taken in a limiting sense.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the 3 claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. An apparatus (100) for enabling a smartphone to function as a remote controller for a radio-controlled instrument, the apparatus comprises:

a fixing support assembly, configured for rigidly clamping a smartphone;

a steering assembly (110), set over the fixing support assembly, configured for maneuvering a first capacitive tip (S-11) over a screen surface of the smartphone for providing steering control over the radio-controlled instrument; and a throttle assembly (112), set over the fixing support assembly, configured for maneuvering a second capacitive tip (T-10) over the screen surface of the smartphone for providing throttle control over the radio-controlled instrument;

characterized in that, the steering assembly (110) and the throttle assembly (112) are configured to transmit a capacitive effect from fingers of the user to the screen of the smartphone in order to remotely control the radio-controlled instrument and aids in receiving haptic return and precision;

wherein the fixing support assembly comprises:

an assembly base structure (A-1) made of molded non-conductive plastic;

a set of rubber tips (A-2, A-3) for protecting contacts of the assembly base structure with the screen surface of the smartphone by increased adherence;

a pair of hooks (A-4, A-5) extensively slidable in opposite direction over the assembly base structure (A-1), by means of slider tension springs (A-6) for rigidly clamping the smartphone on two different sides of either horizontal sides or vertical sides of the smartphone, wherein the pair of hooks are made of molded non-conductive plastic;

a pair of hook tips (A-7) secured on the pair of hooks for protective contact with the smartphone and avoid pressing on buttons of the smartphone; and a rubber band (A-8) arranged for strapping the smartphone over surface opposite to the screen of the smartphone.

2. An apparatus (100) for enabling a smartphone to function as a remote controller for a radio-controlled instrument, the apparatus comprises:

a fixing support assembly, configured for rigidly clamping a smartphone;

a steering assembly (110), set over the fixing support assembly, configured for maneuvering a first capacitive tip (S-11) over a screen surface of the smartphone for providing steering control over the radio-controlled instrument; and a throttle assembly (112), set over the fixing support assembly, configured for maneuvering a second capacitive tip (T-10) over the screen surface of the smartphone for providing throttle control over the radio-controlled instrument;

characterized in that, the steering assembly (110) and the throttle assembly (112) are configured to transmit a capacitive effect from fingers of the user to the screen of the smartphone in order to remotely control the radio-controlled instrument and aids in receiving haptic return and precision;

wherein the steering assembly comprises:

a steering joystick (S-4) having a first joystick tip (S-5) on top of the steering joystick, wherein the steering joystick (S-4), made of conductive plastic, is capable of being rotated left and right as per control of a user and automatically retracts to a rest position upon release by the user, and the first joystick tip (S-5), made of aluminium, has a shape to adapt to a finger of the user;

a pair of steering torsion springs (S-2, S-3) are configured to have increased pressure on one of the pair of steering torsion springs (S-2, S-3) when the steering joystick (S-4) is rotated in either of the left or right by the user, and to retract to the rest position instantaneously when released by the user;

a first joystick spring (S-7), made of spring steel, is configured to push a first sliding pin (S-8) down and make the first capacitive tip (S-11) stay stuck on the screen surface, wherein the first sliding pin (S-8), made of metal, is configured to move freely vertically by means of a first joystick sleeve (S-9) that is made of conductive plastic, and allow the capacitive tip (S-11) to follow the screen surface when the steering joystick (S-4) is rotating;

a steering hood (S-1), made of molded non-conductive plastic, is a housing for the pair of steering torsion springs, and a rotation axis of the steering joystick (S-4);

a first conductive pin (S-6), made of metal, is configured to conduct charge from the first joystick tip (S-5) to the first joystick spring (S-7);

a first joystick piston (S-10), made of metal, is configured to hold the first capacitive tip (S-11) and link the first capacitive tip (S-11) to the first sliding pin (S-8); and a first holding ring (S-12) is configured to press the first capacitive tip (S-11) on the first joystick piston (S-10) and hold the first capacitive tip (S-11) firmly.

3. The apparatus (100) as claimed in claim 2, wherein the steering joystick (S-4), the first joystick tip (S-5), the pair of steering torsion springs (S-2, S-3), the first joystick spring (S-7), the first sliding pin (S-8), the first joystick sleeve (S-9), the first conductive pin (S-6), and the first joystick piston (S-10) are made of conductive materials so as to allow transmission of the capacitive effect from fingers of the user to the screen of the smartphone.

4. The apparatus (100) as claimed in claim 2, wherein upon having the steering joystick (S-4), moving in a left or right direction by the user for achieving desired movement in the radio-controlled instrument, a detected contact on the screen surface of the smartphone slides right or left, so that such movement can be calibrated in an application of the smartphone so as to enable the smartphone application to identify the desired action of the user in real time and operate the radio-controlled instrument accordingly.

5. An apparatus (100) for enabling a smartphone to function as a remote controller for a radio-controlled instrument, the apparatus comprises:

a fixing support assembly, configured for rigidly clamping a smartphone;

a steering assembly (110), set over the fixing support assembly, configured for maneuvering a first capacitive tip (S-11) over a screen surface of the smartphone for providing steering control over the radio-controlled instrument; and a throttle assembly (112), set over the fixing support assembly, configured for maneuvering a second capacitive tip (T-10) over the screen surface of the smartphone for providing throttle control over the radio-controlled instrument;

characterized in that, the steering assembly (110) and the throttle assembly (112) are configured to transmit a capacitive effect from fingers of the user to the screen of the smartphone in order to remotely control the radio-controlled instrument and aids in receiving haptic return and precision;

wherein the throttle assembly comprises:

a throttle joystick (T-3) having a second joystick tip (T-4) on top of the throttle joystick (T-3), wherein the throttle joystick (T-3), made of conductive plastic, is capable of being rotated up and down as per control of the user and automatically retracts to a rest position upon released by the user, and the second joystick tip (T-4), made of aluminium, has a shape to adapt to a finger of the user;

a throttle torsion spring (T-2) is configured to receive increased pressure when the throttle joystick (T-3) is rotated in either of the up or down direction by the user, and to retract to the rest position instantaneously when released by the user;

a second joystick spring (T-6), made of spring steel, is configured to push a second sliding pin (T-7) down and make the second capacitive tip (T-10) stay stuck on the screen surface, wherein the second sliding pin (T-7), made of metal, is configured to move freely vertically by means of a second joystick sleeve (T-8) that is made of conductive plastic, and allow the capacitive tip (T-10) to follow the screen surface when the throttle joystick (T-3) is rotating;

a throttle hood (T-1), made of molded non-conductive plastic, is a housing for the throttle torsion spring, and a rotation axis of the throttle joystick (T-3);

a second conductive pin (T-5), made of metal, is configured to conduct charge from the second joystick tip (T-4) to the second joystick spring (T-6);

a second joystick piston (T-9), made of metal, is configured to hold the second capacitive tip (T-10) and link the second capacitive tip (T-10) to the second sliding pin (T-7); and a second holding ring (T-11) is configured to press the second capacitive tip (T-10) on the second joystick piston (T-9) and hold the second capacitive tip (T-10) firmly.

6. The apparatus (100) as claimed in claim 5, wherein the throttle joystick (T-3), the second joystick tip (T-4), the throttle torsion spring (T-2), the second joystick spring (T-6), the second sliding pin (T-7), the second joystick sleeve (T-8), the second conductive pin (T-5), and the second joystick piston (T-9) are made of conductive materials so as to allow transmission of the capacitive effect from fingers of the user to the screen of the smartphone.

7. The apparatus (100) as claimed in claim 5, wherein upon having the throttle joystick (T-3) moving in upward direction by the user for achieving increased throttle in the radio-controlled instrument, a detected contact on the screen surface of the smartphone slides down, so that such movement can be calibrated in an application of the smartphone so as to enable the smartphone application to easily identify the desired action of the user and operate the radio-controlled instrument accordingly.

\* \* \* \* \*